Patented May 10, 1938

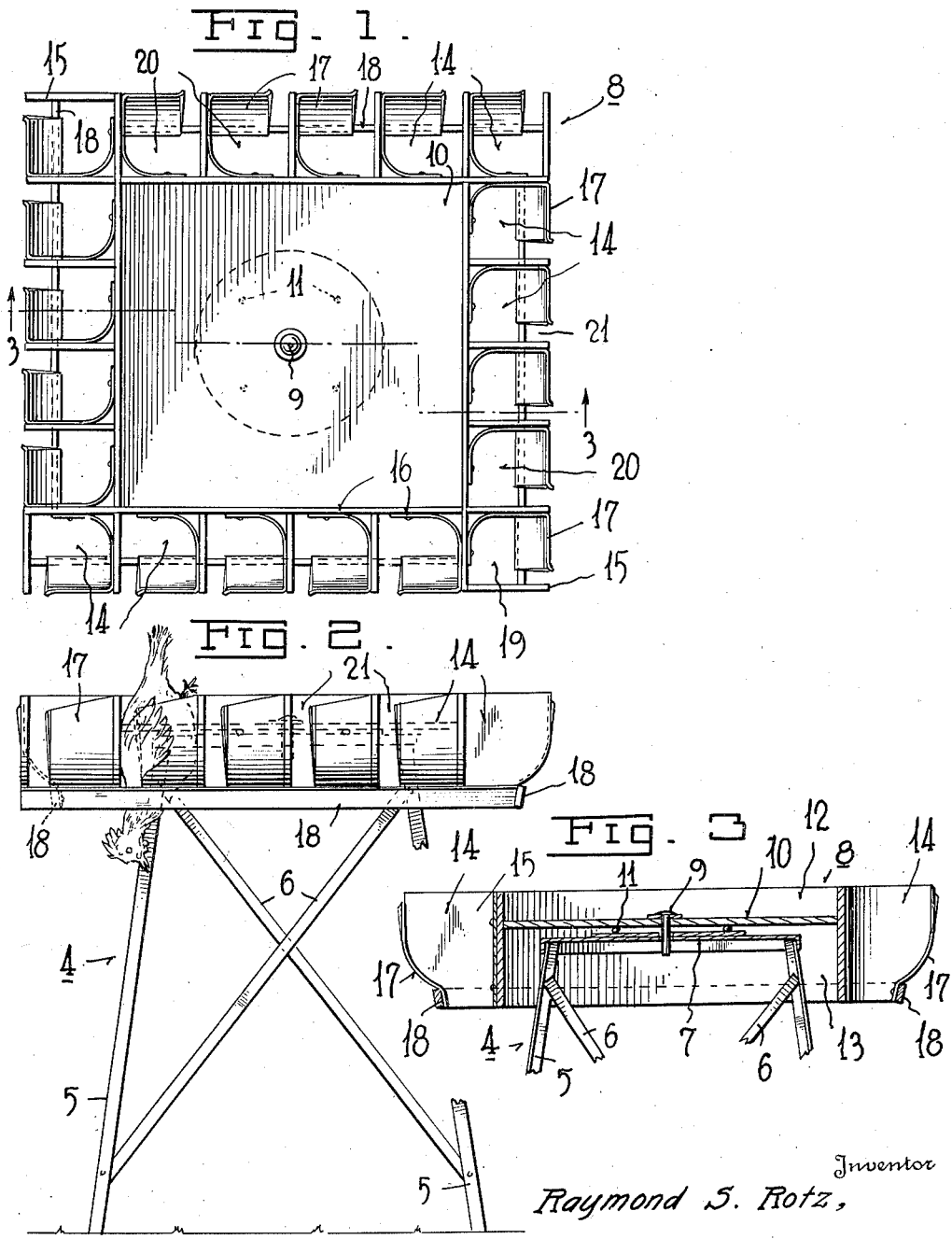

2,116,850

UNITED STATES PATENT OFFICE 2,116,850

FOWL RESTRAINING DEVICE

Raymond S. Rotz, Fort Loudon, Pa.

Application August 4, 1937, Serial No. 157,415

2 Claims. (Cl. 119—97)

This invention relates to an improved restraining device, and more particularly to a novel fowl restraining device.

The primary purpose of the invention is to provide a restraining device which will facilitate the handling of fowl while they are being given a blood test or being culled.

Another object is to provide a fowl restraining device having a turn table provided with stalls, each to receive a single fowl and so arranged that the culler can be filling in the stalls with fowls at all times while the tester can be taking them out after making a blood test.

A further object is to provide a revolving fowl restraining table which will permit the handling of a large number of fowl by a minimum number of operators, as a revolving feature of the table allows the operators to stand at given spots while introducing fowl into the stalls and removing fowl from the stalls.

A still further object is to furnish a fowl restraining device having stalls for holding fowl, each with one wing extending outwardly to facilitate blood testing and the like.

Another object is to supply a fowl restraining table having a removable top to permit the table to be rapidly set up or dismantled for storage purposes.

With the foregoing objects outlined and with other objects in view which will appear as the description proceeds, the invention consists in the novel features hereinafter described in detail in connection with the accompanying drawing and more particularly pointed out in the appended claims.

In the drawing:

Fig. 1 is a top plan view of my improved table.

Fig. 2 is a side elevation partially broken away.

Fig. 3 is a fragmentary vertical sectional view taken on the line 3—3 of Fig. 1.

Referring to the drawing, 4 designates a suitable support preferably formed of legs 5, braces 6 and a top member 7, all suitably connected together to form a rigid base.

A top 8 is removably and rotatably mounted on the base and is held in position by a removable pivot pin 9, which passes through the center of the top member of the base and through the central plate 10 of the top. Any suitable anti-friction means 11 may be provided between the members 7 and 10 to facilitate rotation of the top.

The plate 10 is surrounded by an annular wall 12 which may be of rectangular shape and is preferably provided with a skirt portion 13 which overhangs the upper portion of the base.

The wall carries a number of stalls or pockets 14, each of which is especially constructed to hold or restrain a fowl. To this end, each stall has vertical parallel side walls 15, a vertical rear wall 16 and a downwardly and inwardly sloping front wall 17. The lower ends of the front walls are connected to horizontal strips 18 which cooperate with the side and rear walls to form bottom openings or ports 19 through which the heads of the fowl may be extended. Vertical slots 21 are provided in the front wall of each stall to permit one wing of the fowl to project outwardly from the stall as shown in Fig. 2.

The construction of each stall is such that an operator can rapidly introduce fowl into the pockets, each with one wing projecting to facilitate blood testing, and owing to the sloping front wall of each pocket, the interior is substantially wedge shaped whereby a fowl attempting to escape becomes more firmly held by the device.

In using the apparatus one man can rapidly introduce the fowls into the stalls and another can speedily test them. Then a third man or the tester himself, can remove the fowl after testing. In this way the fowl that test properly can be rapidly released into the chicken yard, while the reactors may be speedily removed to a confining pen.

As the plate 8 is flat, it will serve to support the electrically heated plates now employed in testing for pullorum disease.

For culling purposes, the pockets or stalls will facilitate the handling of the fowl by the culler.

While I have disclosed what I now consider to be a preferred embodiment of the invention in such manner that the same may be readily understood by those skilled in the art, I am aware that changes may be made in the disclosure without departing from the spirit of the invention as expressed in the claims.

What I desire to secure by Letters Patent is:

1. A fowl restraining device comprising supporting means, a stall supported by said means and forming a substantially wedge shaped pocket having an opening at its small lower end for the passage of the head of a fowl, the stall having front, rear and side walls, the front wall being provided with a substantially vertical slot extending from its upper edge to a point in close proximity to its lower end and adapted to allow a wing of a fowl to project from the stall when a fowl is introduced headforemost into the stall, and a barrier arranged at the lower end of the slot and forming the only obstruction of the slot.

2. A fowl restraining device comprising a turn-table having a series of stalls disposed about its periphery and supported thereby, each stall forming a substantially wedge-shaped bottom having an opening at its small lower end for the passage of the head of a fowl, the stall having front, rear and side walls, the front wall being provided with a substantially vertical slot extending from its upper edge to a point in close proximity to its lower end and adapted to allow a wing of a fowl to project from the stall when a fowl is introduced headforemost into the latter, and a barrier arranged at the lower end of the slot of each stall and forming the only obstruction of the slot, one wall of each stall forming a common wall of two stalls and there being corner stalls, each corner stall having at least one wall not common to any other stall.

RAYMOND S. ROTZ.